2,910,053

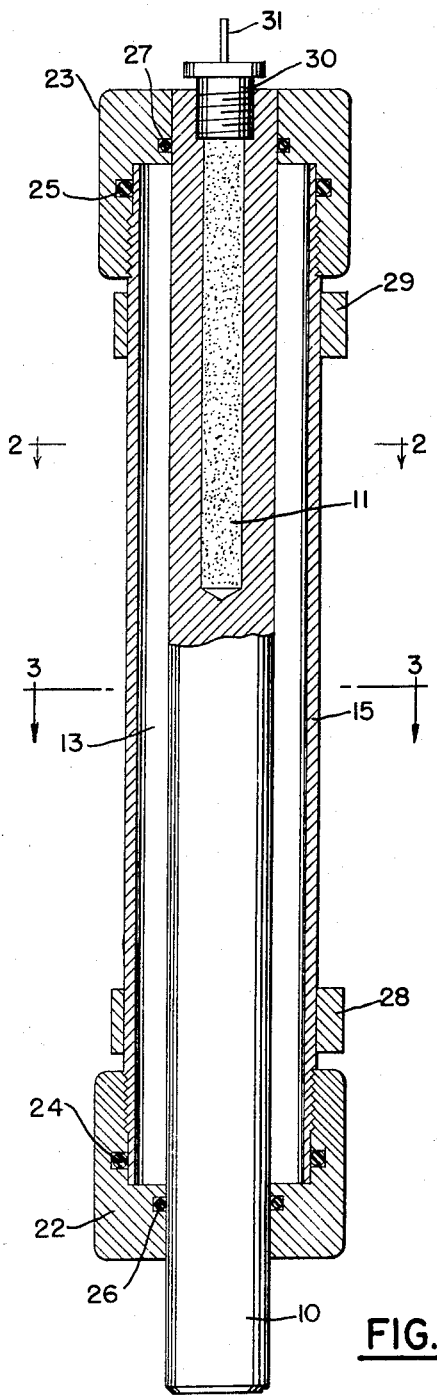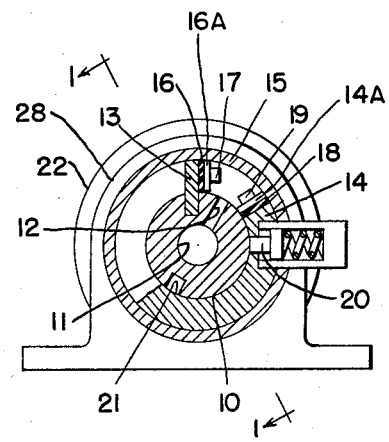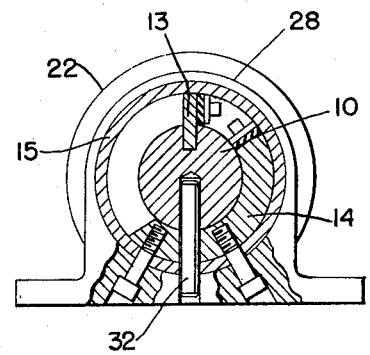
FIG. 1.
FIG. 2.
FIG. 3.
INVENTOR.
ALBERT M. STOTT
FRANCIS J. SHINALY

ROTARY THRUSTER

Albert M. Stott, Aldan-Clifton Heights, and Francis J. Shinaly, Levittown, Pa., assignors to the United States of America as represented by the Secretary of the Army Application August 1, 1958, Serial No. 752,674

2 Claims. (Cl. 123—24)

(Granted under Title 35, U.S. Code (1952), sec. 266)

The invention described herein may be manufactured and used by or for the Government for governmental purposes without the payment of any royalty thereon.

This invention relates to rotary thrusters and is in the nature of an improvement on the rotary thruster disclosed by a copending application of Hollis L. Muller, Jr., and Charles M. King, filed May 23, 1958, Ser. No. 737,461, for "Rotary Thruster."

As pointed out in the aforesaid application, the thrusters heretofore available have usually been designed to produce a linear thrust which requires considerable space. Such space is not available in some situations. It is to meet these situations and to make available a rotational type of thrust that the rotary thruster has been developed.

The particular improvements resulting from the present invention relate more particularly (1) to the provision of a combustion chamber located within the drive shaft of the thruster and (2) to the provision of means for locking the shaft in its rotated position.

The invention will be better understood from the following description when considered in connection with the accompanying drawings and its scope is indicated by the appended claims.

Referring to the drawings:

Fig. 1 is a longitudinal view, mostly in section, of the improved thruster,

Fig. 2 is a section taken on the line 3—3 of Fig. 1 and taken on the line 2—2 of Fig. 1, and Fig. 3 is a similar section showing the shear pin by which the drive shaft is held in a fixed position until the operating gas has attained a predetermined pressure.

The thruster illustrated by Figs. 1 and 2 includes a rotatable shaft 10 which is hollowed out to form a combustion chamber 11 from which an outlet 12 leads to an enclosure between a member 13 fixed to the shaft 10 and a member 14 fixed to a stator 15. It will be noted that (1) a sealing strip 16 is clamped to the member 13 by a bolt 17, and clamping plate 16A, (2) a similar sealing strip 18 is clamped to the member 14 by a bolt 19 and clamping plate 14A, (3) a spring biased plug 20 is arranged to mate with a slot 21 when the shaft 10 is rotated to its final position.

As shown more particularly in Fig. 1, the stator 15 is in the form of a cylinder having at its opposite ends caps 22 and 23 which are threaded onto the ends of the cylinder and are provided with seal rings 24 and 25. Similar seal rings 26 and 27 are provided between the end caps and the shaft 10. The thruster is supported by brackets 28 and 29 and a cartridge 30 is arranged in the hollow end of the shaft 10 to be fired by a firing mechanism 31.

In the sectional view of Fig. 3 is shown a shear pin 32 which is made to fit snugly in all the parts except the shaft 10 where it is given a free fit.

In the operation of the thruster, the cartridge 30 is fired in a well-known manner to generate a high pressure gas in the combustion chamber 11. This gas is channeled through the openings 12 (see Fig. 2) in the shaft 10 and acts on the rotor vane 13 to rotate the shaft. Due to the area of the vane, a high torque is developed which shears the pin 32 (see Fig. 3) and rotates the shaft which has keys or splines for coupling it to the device to be driven. Rotation of the shaft continues until the key 20 engages the slot 21 when the shaft is fixed in position.

We claim:

1. A thruster including a casing with bearings at its opposite ends, a shaft rotatable in said bearings and spaced from said casing to form an annular chamber, a partition fixed to said casing and forming a closure between said shaft and said casing, a vane fixed to said shaft and forming a closure between said shaft and said casing, said shaft being arranged to form a combustion chamber communicating with said annular chamber between said partition and said vane, and means for preventing movement of said shaft until a predetermined pressure is exerted between said partition and said vane.

2. A thruster according to claim 1 wherein means are arranged to interlock said casing and said shaft at the end of said movement.

References Cited in the file of this patent

UNITED STATES PATENTS

| | | |
|---|---|---|
| 1,001,684 | Rainalter | Aug. 29, 1911 |
| 2,218,719 | Richards | Oct. 22, 1940 |
| 2,247,508 | Lawler | July 1, 1941 |
| 2,283,184 | Coffman | May 19, 1942 |
| 2,443,333 | Tucker | June 15, 1948 |